United States Patent [19]
Bernard

[11] 3,872,901
[45] Mar. 25, 1975

[54] CUTTING DEVICE
[75] Inventor: Denis Bernard, La Ravoire, France
[73] Assignee: C.E.M.E.T. Societe Anonyme, La Ravoire, France
[22] Filed: Oct. 12, 1973
[21] Appl. No.: 405,750

[30] Foreign Application Priority Data
July 9, 1973 France .................. 73.25132

[52] U.S. Cl. ............... 144/34 R, 83/788, 83/790, 144/218
[51] Int. Cl. .......................................... A01g 23/08
[58] Field of Search ........ 144/34 R, 34 B, 235, 2 N, 144/231, 230, 218, 3 D, 312, 309 A, 237

[56] References Cited
UNITED STATES PATENTS
| | | | |
|---|---|---|---|
| 789,512 | 5/1905 | Waller | 144/34 R X |
| 2,474,559 | 6/1949 | Walters | 144/218 |
| 3,059,491 | 10/1962 | Hoff et al | 83/788 X |
| 3,308,860 | 3/1967 | Shano | 144/218 X |
| 3,425,467 | 2/1969 | Willis | 144/218 |

Primary Examiner—Andrew R. Juhasz
Assistant Examiner—W. D. Bray
Attorney, Agent, or Firm—Robert E. Burns; Emmanuel J. Lobato; Bruce L. Adams

[57] ABSTRACT

A cutting device particularly suitable for forestry application. The device has two cutting discs coaxially mounted for rotation about a common axis. The discs are spaced apart along the common axis and each has a plurality of radially outwardly directed cutting tools mounted around its periphery. Located between the two cutting discs is a cutting chain having outwardly directed cutting tools. The chain moves along a guideway describing a circular sector about the common axis of the discs and in use removes the wood left between the two discs.

5 Claims, 2 Drawing Figures

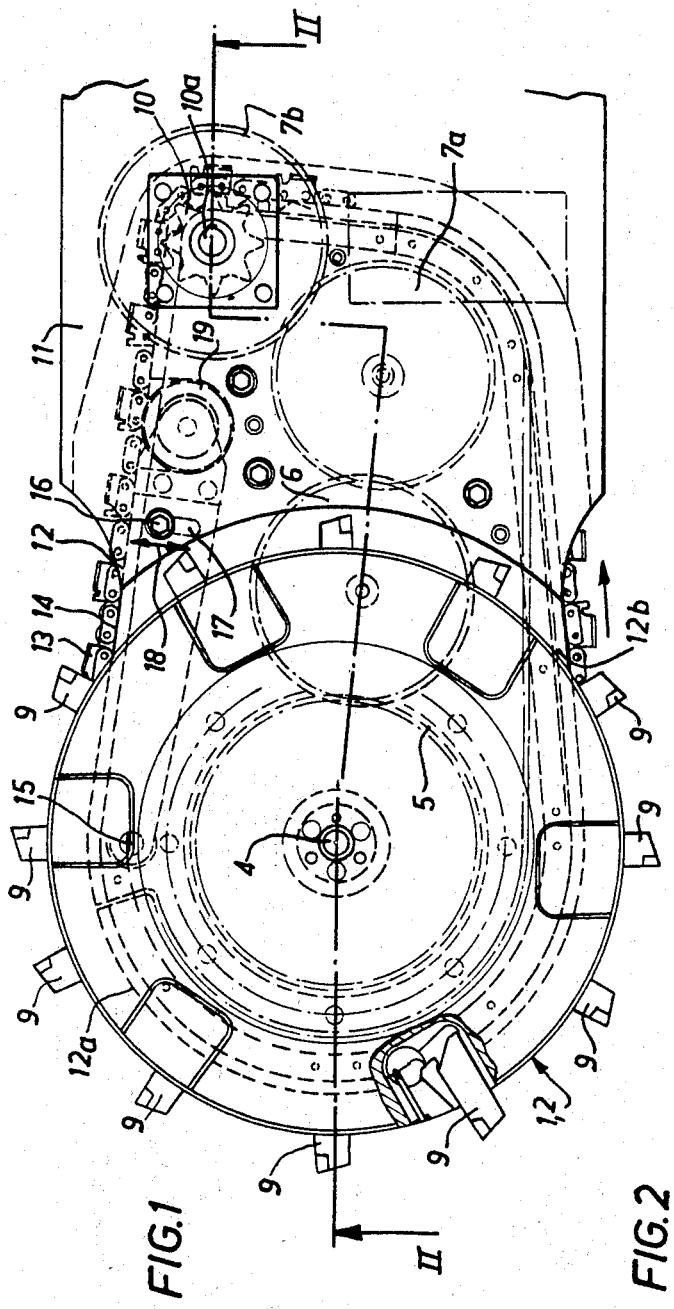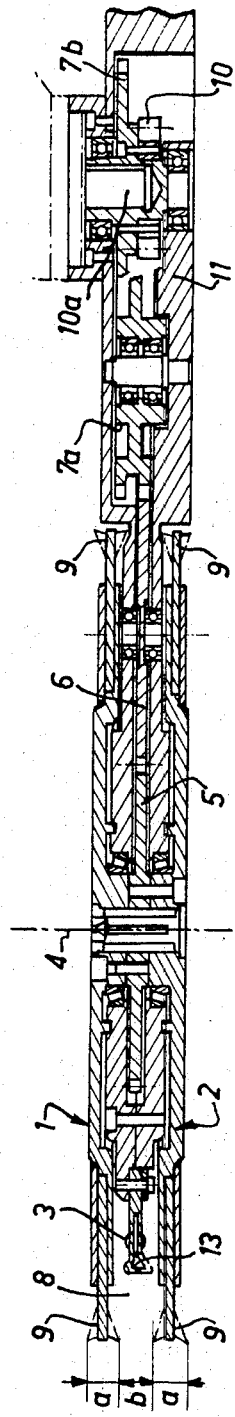

3,872,901

CUTTING DEVICE

BACKGROUND OF THE INVENTION

This invention relates to a cutting device and in particular to an improved cutting device especially suitable for the cutting of wood.

It is known that in forestry, cutting devices are in use in the form of flat discs provided on their periphery with cutting tools evenly distributed around the axis of the disc. To increase the width of the cut made, the use of a number of coaxial cutting discs has been contemplated. However, owing to the presence of the cutting tools on the discs, these latter have to be properly spaced out along their common axis of rotation, so that in place of the desired wide cut two separate cuts are effected, with a residual uncut portion being left approximately corresponding to the space between the two discs.

A general object of the present invention is to remedy this drawback and to provide an improved cutting device.

SUMMARY OF THE INVENTION

According to the invention there is provided a cutting device for forestry, comprising two cutting discs coaxially mounted for rotation about a common axis, said cutting discs spaced apart along said axis, a plurality of radially outwardly directed cutting tools mounted around the periphery of each cutting disc, an endless chain having outwardly directed cutting tools mounted thereon located between said discs, means for moving said chain along a guideway describing at least a circular sector about said common axis of said discs, and means for rotating said discs.

BRIEF DESCRIPTION OF THE DRAWING

An embodiment of the invention will now be described by way of example only, with reference to the accompanying drawing, in which:

FIG. 1 is an elevation of a cutting device made according to the invention; and

FIG. 2 is a section along the line II—II of FIG 1.

FIGS. 1 and 2 show a cutting device particularly suitable for use in the sphere of forestry, e.g. for the cutting of timber, and comprising an upper cutting disc 1, a lower cutting disc 2 and a cutting chain 3.

The cutting discs 1 and 2 are coaxially mounted for rotation about a common vertical shaft 4. They are driven by one single central gear wheel 5, in its turn driven by a motor pinion 10a via secondary gear wheels 6, 7a and 7b. The two cutting discs 1 and 2 are spaced apart from each other along their common shaft 4 in such an annular way as to provide a space 8 therebetween. A part of this space 8 provides a space in the form of a sector of a cylindrical ring, in which is accommodated, as will be seen in due course, the cutting chain 3.

Each cutting discs 1 and 2 is fitted on its periphery with radial cutting elements 9, extending outwardly from the disc and evenly distributed around the axis of rotation provided by shaft 4. The cutting elements 9 are preferably detachable so that they can be removed and replaced without difficulty.

The endless cutting chain 3 situated between the two discs 1 and 2 is driven by a driving gear wheel or sprocket 10 keyed onto the motor pinion 10a, from which the discs are likewise driven. The entire drive system, as shown, is mounted on a frame 11 of the cutting device. As also shown, a gear 7b is mounted coaxially with sprocket 10 and in mesh with a first transmission gear 7a; that gear is in mesh with a second transmission gear 6, which in turn drives an idler sprocket coaxial with gear 5 to guide chain 3. The cutting chain 3 thus moves in a guideway 12 forming a loop, comprising a first part 12a taking the form of a circular arc or sector about the shaft or axis 4, and a connecting part 12b interconnecting the two ends of the first part 12a and surrounding the gear wheel 10. Each alternate link of the chain 3 is provided with a cutting tool 13 of a known type.

The outermost edge of each cutting chain tool 13 is set back from the outermost edge of the cutting elements 9 of the discs 1 and 2 in the circular sector 12a, the chain 3 and the cutting tools 13 thus being situated in the aforementioned space 8.

The linear speed of the cutting chain 3 and its direction of travel are independent of the speed and direction of the discs 1, 2 and the chain speed is preferably distinctly lower than the speed of the cutting elements 9 of the cutting discs 1 and 2. By this arrangement the cutting operation is substantially effected by the cutting elements 9 of the two discs 1 and 2, the chain 3 then acting to clear away the uncut material in the residual space between the two cuts corresponding to the two discs. By way of an example, purely for the purpose of information, the linear speed of the cutting elements 9 can be of the order of 40 metres per second, corresponding speed of the chain 3 being of the order of 8 metres per sec.

The superiority of the cutting device provided by the invention may be seen from FIG. 2. The use of one single cutting disc provides a cut of width $a$. The use of two cutting discs spaced out in respect of each other in the axial direction produces two cuts each of width $a$. The use of the cutting device according to the invention comprising two cutting discs and a cutting chain, produces a cut of a width $2a + b$.

In a preferred embodiment of the invention the cutting device is provided with a chain tension regulating device. This is shown in the form of a plate 14 slidable in frame 11. Part of the outer edge of plate 14 forms a portion of the arc-shaped chain guideway 12. The plate 14 has an end pivoted on a pin 15 perpendicular to the plane of the discs 1, 2 and capable of being secured in a given position by any suitable locking means such as a bolt 16 passing through a slot 17 in the plate 14. The plate 14 can thus be displaced in the directions shown by the arrows 18 in such a way as to increase or reduce the perimeter of the guideway 12. In one possible alternative construction, that extremity of the plate 14 which is farther away from the pin 15 comprises a guide roller over which the chain passes, the roller being freely rotatable about its axis perpendicular to the plane of the discs.

A cutting device according to the invention can be used either alone or in conjunction with arms serving to grip the tree to be cut and situated above the cutting device and mounted on an independent motor apparatus optionally provided with means for collecting the cut timber.

What is claimed is:

1. A device for making a wide saw cut, said device comprising; a frame; means defining an axis thereon; at least two discs coaxially mounted on said frame for rotation about said axis, said discs being spaced apart along said axis, each disc having a plurality of cutters radially outwardly extending from the disc and mounted thereon at mutually spaced locations near the periphery the disc; means defining an arc-shaped guideway coaxial with and between said discs; an endless chain movable along said frame and arc-shaped guideway, said chain having a plurality of outwardly extending cutters mounted thereon and located between said discs when the chain moves along said arc-shaped guideway; means on said frame for rotating said discs; and means on said frame for moving said chain along said frame and arc-shaped guideway; whereby the cutters on said discs make mutually spaced narrow saw cuts and the cutters on said chain clear out uncut material between said spaced, narrow saw cuts, as the several cutters move along said arc-shaped guideway.

2. A device according to claim 1 wherein the discs, arc-shaped guideway and cutters are so dimensioned that the cutters on the discs project beyond the cutters on the chain where the chain moves along said arc-shaped guideway.

3. A device according to claim 1 wherein said means for rotating said discs and said means for moving said chain comprise means for moving the cutters on the discs at a linear speed more rapid than that of the cutters on the chain along said arc-shaped guideway.

4. A device according to claim 1 including means mounted on said frame for regulating the tension of said chain, said tension regulating means comprising plate means and means for articulating said plate means to adjust the tightness of said chain.

5. A device according to claim 4 including a guide roller mounted at an end of said plate means for guiding said chain.

* * * * *